United States Patent [19]
Heppner et al.

[11] Patent Number: 5,293,740
[45] Date of Patent: Mar. 15, 1994

[54] METHOD AND ARRANGEMENT FOR CONTROLLING THE QUANTITY OF FUEL FOR AN INTERNAL COMBUSTION ENGINE HAVING A CATALYTIC CONVERTER

[75] Inventors: Bernd Heppner, Schwieberdingen; Wolfgang Richter, Ludwigsburg; Axel Stuber, Ludwigsburg, all of Fed. Rep. of Germany

[73] Assignee: Robert Bosch GmbH, Stuttgart, Fed. Rep. of Germany

[21] Appl. No.: 937,430

[22] Filed: Aug. 31, 1992

[30] Foreign Application Priority Data

Aug. 29, 1991 [DE] Fed. Rep. of Germany ....... 4128718

[51] Int. Cl.$^5$ ............................................. F02D 41/14
[52] U.S. Cl. ........................................ 60/274; 60/276; 60/285
[58] Field of Search ................. 60/274, 276, 277, 285; 123/691, 674

[56] References Cited

U.S. PATENT DOCUMENTS

| 5,018,348 | 5/1991 | Dürschmidt et al. | 60/274 |
| 5,088,281 | 2/1992 | Izutani et al. | 60/276 |
| 5,092,123 | 3/1992 | Nada et al. | 60/276 |
| 5,103,640 | 4/1992 | Nada et al. | 60/285 |
| 5,172,320 | 12/1992 | Nada et al. | 60/285 |

*Primary Examiner*—Tony M. Argenbright
*Assistant Examiner*—Thomas Moulis
*Attorney, Agent, or Firm*—Walter Ottesen

[57] ABSTRACT

The invention is directed to a method for controlling the fuel quantity for an internal combustion engine having a catalytic converter and includes the steps of: determining the air mass flow inducted by the engine; determining a precontrol variable for the quantity of fuel in dependence on current values of operating variables of the engine; presetting a desired lambda value for the air/fuel mixture to be supplied to the engine; checking the actual lambda value of the exhaust gas forward of the catalytic converter; comparing the desired lambda value to the actual lambda value to form a comparison; controlling the fuel quantity in dependence upon the comparison; determining the oxygen actual charge level of the catalytic converter; comparing the determined actual charge level to a desired charge level; and, then, when the actual charge level is greater than the desired charge level, lowering the desired lambda value to below the value one; otherwise, when the actual charge level is less than the desired charge level, increasing the desired lambda value above the value one. This method leads to the condition that very low toxic exhaust gas is produced even for transient operations since the catalytic converter almost always has sufficient storage capacity for further oxygen which occurs temporarily or adequate oxygen for combusting fuel which occurs temporarily. The invention is also directed to an arrangement for carrying out the method.

13 Claims, 4 Drawing Sheets

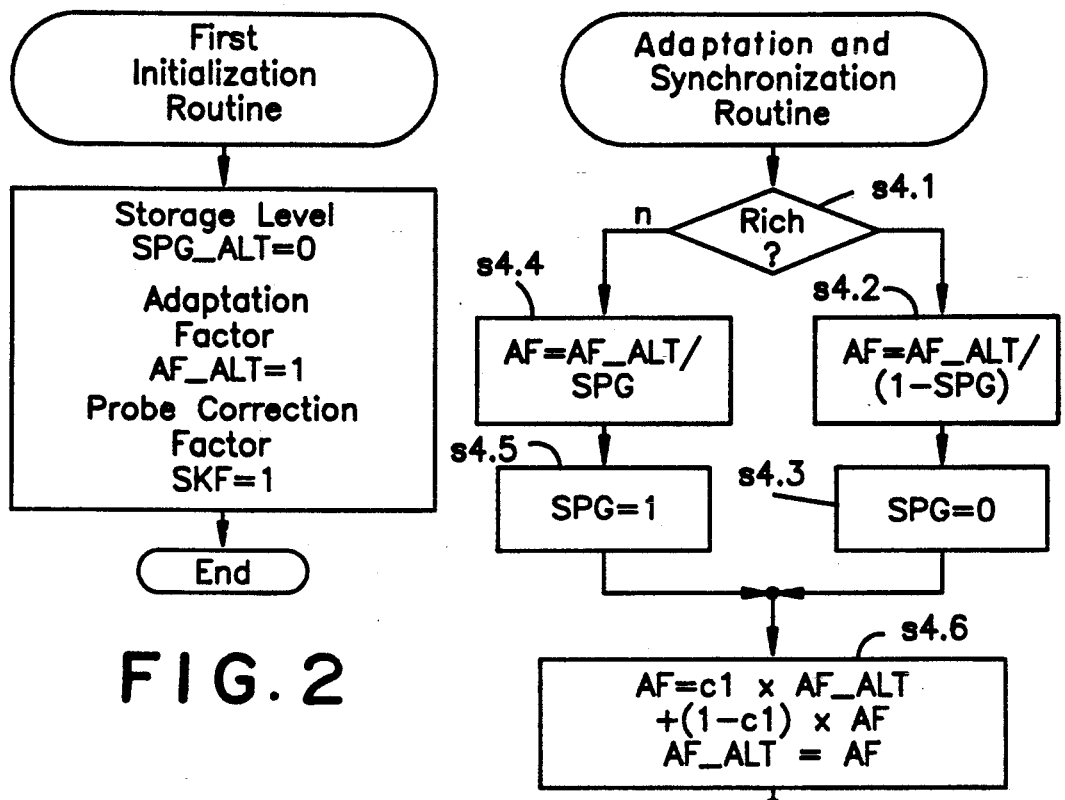
FIG. 2
FIG. 4
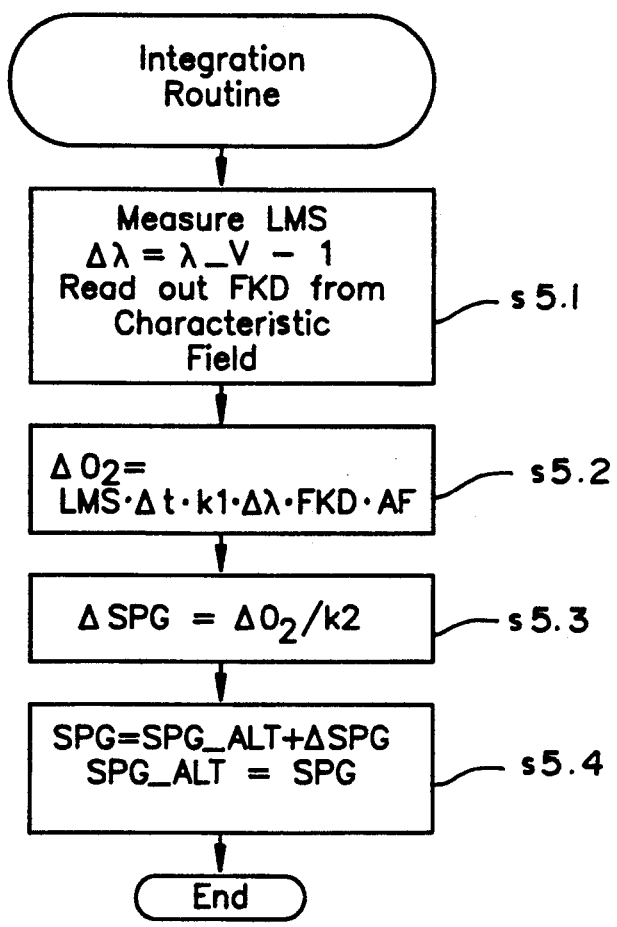
FIG. 5

METHOD AND ARRANGEMENT FOR CONTROLLING THE QUANTITY OF FUEL FOR AN INTERNAL COMBUSTION ENGINE HAVING A CATALYTIC CONVERTER

BACKGROUND OF THE INVENTION

A method for controlling the quantity of fuel incorporating the following method steps is already known, namely: determining the air-mass flow drawn in by suction by the engine; determining a precontrol variable for the quantity of fuel in dependence upon current values of operating variables of the engine; presetting a desired lambda value for the air/fuel mixture to be supplied to the engine; checking the actual lambda value of the exhaust gas of the engine forward of the catalytic converter; and, controlling the quantity of fuel in dependence upon a comparison of desired and actual lambda values.

It is noted that a desired value is actually pregiven only for continuous controllers and two-step controllers having actual value sensors which measure linearly. In contrast, for two-step controllers having very non-linear sensors, a desired value (here a lambda value) is preset by changing, for example, the switching thresholds, the amplitude of P-jumps or integration speeds and integration times.

An improvement of the above-mentioned method is disclosed in U.S. Pat. No. 5,207,056. The improvement of the known method is provided in this patent in that after a transient disturbance, a control to the desired lambda value is not immediately made; instead, a lambda value disturbance is arbitrarily called up which has an effect which precisely compensates for the effect of the disturbance which was caused by the transient operation. If, for example, the mixture was made too lean because of the transient operation, then an especially large amount of oxygen reaches the catalytic converter and the mixture is so controlled after the decay of the transient operation that the mixture becomes enriched temporarily with respect to the actually wanted desired value one. This enrichment takes place for so long and to such an extent that, because of the fuel supplied in excess, just that oxygen stored in the catalytic converter is combusted which had collected there in the previously-mentioned lean phase.

Furthermore, it is known that the general method mentioned initially can be modified by a second lambda probe mounted rearward of the catalytic converter. A method is described in U.S. Pat. No. 5,018,348 according to which the signal of the rearward lambda probe is utilized to so compensate the signal of the forward lambda probe that the mean value of the signal from the forward lambda probe corresponds to the mean value of the signal from the rearward lambda probe. This measure is based on the realization that a lambda probe mounted rearward of the catalytic converter deteriorates considerably less than a probe mounted forward of the catalytic converter so that the signal from the rearward probe is more reliable over a longer period of time than the signal from the forward lambda probe.

With a probe mounted rearward of the catalytic converter, it is also possible to monitor the oxygen storage capacity of a catalytic converter. Many methods are known for performing this task. All of the methods are based on the consideration that, starting with a catalytic converter which is empty as to oxygen, some time is required after setting a lean mixture until the catalytic converter is filled with oxygen and a lean mixture is measured not only at the input but also at the output of the catalytic converter. And, proceeding from a catalytic converter filled with oxygen, after adjusting a rich mixture, a corresponding time delay occurs between the time points of the announcement of the rich mixture from the forward probe and then from the rearward probe. The time delay or the mean signal amplitudes associated therewith are a measure for the storage capacity of the catalytic converter. Depending upon this storage capacity, it is advantageous to change the operating parameters of the lambda control.

Notwithstanding this change and further changes of the general method described above, it remains impossible even for a new catalytic converter to optimally hold down the exhaust gas emission from the engine having a catalytic converter in all operating conditions, especially for transient operations. Accordingly, the problem existed to provide a method and an arrangement for controlling the quantity of fuel for an internal combustion engine having a catalytic converter which provide still lower emissions of toxic exhaust gas than has previously been possible.

SUMMARY OF THE INVENTION

The method of the invention is for controlling the fuel quantity for an internal combustion engine having a catalytic converter. The method includes the steps of: determining the air mass flow inducted by the engine; determining a precontrol variable for the quantity of fuel in dependence on current values of operating variables of the engine; presetting a desired lambda value for the air/fuel mixture to be supplied to the engine; checking the actual lambda value of the exhaust gas forward of the catalytic converter; comparing the desired lambda value to the actual lambda value to form a comparison; controlling the fuel quantity in dependence upon the comparison; determining the oxygen actual charge level of the catalytic converter; comparing the determined actual charge level to a desired charge level; and, then, when the actual charge level is greater than the desired charge level, lowering the desired lambda value to below the value one; otherwise, when the actual charge level is less than the desired charge level, increasing the desired lambda value above the value one.

The oxygen-desired charge level is, for example, 50%; this means that the catalytic converter is intended to store 50% of that quantity of oxygen which it can maximally receive in dependence upon its actual operating age. If a transient operation with a lean mixture occurs, then the stored quantity of oxygen is increased further. The actual charge level is then greater than the desired charge level whereupon the desired lambda value is lowered to a value less than one. This has the consequence that oxygen in the catalytic converter is combusted by fuel exiting uncombusted from the internal combustion engine. This enrichment takes place so long until the desired charge level is again reached. The reverse applies to a transient disturbance with a rich mixture.

The procedure outlined above affords the advantage that all types of disturbances can be optimally buffered.

In order to determine the actual charge level of the catalytic converter, the current stored quantity of oxygen as well as the maximum storable quantity of oxygen must be known. The current stored quantity of oxygen can be determined with relative precision with the aid of a time-dependent integration method from the inducted air-mass flow, the content of oxygen in air and the deviation of the lambda value from the value one. The determination is precise because the air mass can be determined with rather good accuracy, the content of oxygen in air is (independent of the elevation above sea level and the air temperature) essentially constant and the deviation of the lambda value from the lambda value one is measured either via a probe relatively precisely or can be determined from deviations of the injection time from that injection time which is required in order to lead just to the lambda value one together with the air quantity.

The maximum storable quantity of oxygen is viewed as being constant in a simple embodiment of the invention. This has the consequence that, for a specific current stored quantity of oxygen with increasing deterioration of the catalytic converter, an increasing charge level results since, with increasing deterioration, the maximum storable quantity of oxygen actually reduces. In this method, it is recommended that the desired charge level for a new catalytic converter be set somewhat lower than actually desired so that the charge level for an old catalytic converter is somewhat greater than actually wanted which, however, has the consequence that considerably less exhaust gas emission is obtained than with conventional methods. However, it is still better to continuously actualize the maximum storable oxygen quantity with the aid of an adaptation method. This takes place preferably with the aid of a lambda probe mounted rearward of the catalytic converter. When this probe announces an empty or full catalytic converter with respect to oxygen, but this does not fit to the charge level as had been determined with the aid of the actual integration value for the oxygen quantity and the applicable maximum storable oxygen quantity which had previously been determined, that value for the maximum storable oxygen quantity is so changed that again a match with reference to the two charge levels determined in the known manner is applicable. By changing the maximum storable oxygen quantity, a reduction of the same applies as a rule. Preferably, this reduction does not take place directly but indirectly in that the integration value for the current stored oxygen storage quantity is multiplied by a factor which was increased compared to the value one in a manner required for the correction. This affords the advantage that with increasing catalytic converter deterioration, the integration speed referred to the current storage capacity for the charge level is increased and therefore the desired value is changed more rapidly and the lambda controller can counter disturbances more rapidly.

Experiments have shown that it is advantageous to average the current stored oxygen quantity not only by means of the product referred to above; but, the above-mentioned product is additionally multiplied by a correction factor which is determined from a characteristic field in dependence upon current values of operating variables of the engine. These operating variables are especially those which characterize the gas throughput through the engine and therefore through the catalytic converter. For low gas throughputs, essentially all oxygen flowing into the catalytic converter is adsorbed as long as the maximum storable quantity has not yet been reached. This applies less and less for increasingly high throughputs. Less and less of the oxygen contained in the gas during the throughput is adsorbed by the catalytic converter. A very low influence is also dependent upon the temperature of the catalytic converter. This affects the maximum storable oxygen quantity. However, the change of the maximum storable oxygen quantity can be corrected by a corresponding characteristic field dependency of the above-mentioned factor for the oxygen quantity entering the catalytic converter.

The arrangement of the invention is for controlling fuel quantity for an internal combustion engine having a catalytic converter and includes: an air flow detector for detecting the air mass flow inducted by the engine; means for determining a precontrol variable for the quantity of fuel in dependence upon current values of the operating variables of the engine; means for presetting a desired lambda value for the air/fuel mixture to be supplied to the engine; a lambda probe disposed forward of the catalytic converter for checking the actual lambda value of the exhaust gas of the engine; comparison means for comparing the desired and actual lambda values to obtain a comparison; a lambda controller for controlling the fuel quantity in dependence upon the comparison between the desired lambda value and the actual lambda value; means for determining the oxygen actual charge level of the catalytic converter; and, means for changing the desired value for the lambda control in dependence upon a comparison between the actual and desired charge levels of the catalytic converter in such a manner that, when the actual charge level is greater than the desired charge level, the desired lambda value is lowered to below the value one; otherwise, when the actual charge level drops below the desired charge level, the desired lambda value is increased above the value one.

With the arrangement of the invention, the above-described advantages can be obtained. Preferably, the arrangement of the invention is so configured that it includes a lambda probe rearward of the catalytic converter.

The logical functions of the arrangement according to the invention are in practice realized by a correspondingly programmed microcomputer.

BRIEF DESCRIPTION OF THE DRAWINGS

The invention will now be described with reference to the drawings wherein:

FIG. 2 is a flowchart for a first initialization routine;

FIG. 4 is a flowchart of an adaptation and synchronization routine in the sequence of FIG. 3;

FIG. 5 is a flowchart of an integration routine in the sequence of FIG. 3; and,

DESCRIPTION OF THE PREFERRED EMBODIMENTS OF THE INVENTION

Figure 1:
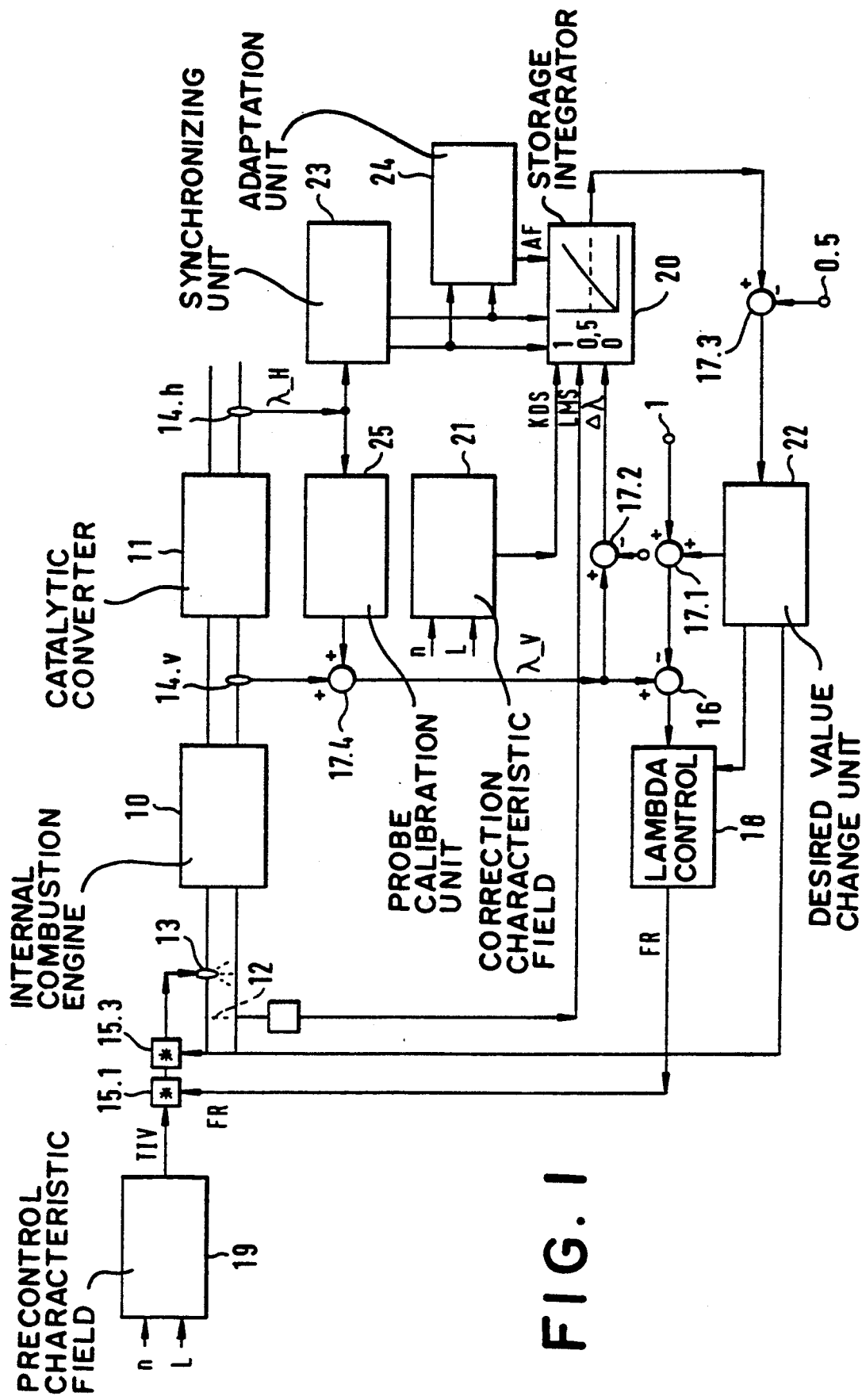
FIG. 1 is a block diagram of an arrangement for controlling the quantity of fuel for an internal combustion engine having a catalytic converter with the control being carried out with the aid of a comparison of desired and actual charge levels of the catalytic converter.

The arrangement shown in FIG. 1 for controlling a quantity of gas operates on an internal combustion engine 10 having a catalytic converter 11. Air is supplied to the engine 10 via an intake pipe in which an air flow sensor 12 is mounted. Fuel is injected into the intake pipe by an injection valve 13. The lambda value of the exhaust gas forward of the catalytic converter 11 is measured with the aid of a forward lambda probe 14.v; whereas, the lambda value of the exhaust gas rearward of the catalytic converter is detected by a rearward lambda probe 14.h.

It is noted that the air mass flow LMS inducted by the engine 10 can also be detected by other known ways rather than with an air flow sensor. It is also noted that the fuel quantity can be metered in another way than via an injection valve and that other probes can be used for detecting the oxygen content in the exhaust gas forward and rearward of the catalytic converter in lieu of the lambda probes. Furthermore, it is noted that a variable "L" is shown in the diagram of FIG. 1. This is a load signal which, for example, is obtained as the quotient of the air mass flow LMS and the speed (n) of the engine. The load signal can however also be determined in other known ways such as from the underpressure in the intake pipe.

The primary control loop of the arrangement for controlling the quantity of fuel is shown in FIG. 1 with solid signal lines. According to this signal trace, the injection valve 13 receives an actuating signal from a first multiplier element 15.1. This actuating signal leads to a specific metering of fuel which, together with the inducted air mass, has as a consequence a specific lambda value of the exhaust gas. This lambda value $\lambda\_V$ is measured by the forward lambda probe 14.v and is compared in a comparator 16 to a desired value $\lambda\_DES$ which is supplied by a first adder 17.1. The control deviation formed from the values of $\lambda\_DES$ and $\lambda\_V$ is supplied to a lambda controller 18 which emits a control factor FR (that is not the actuating variable directly) to the first multiplier 15.1. There, the control factor is multiplied by a value TIV for a preliminary injection time as it is read out of the precontrol characteristic field 19 which can be addressed by actual values of engine speed (n) and the load L.

As mentioned above, the desired lambda value is supplied to the comparator 16 from an adder wherein a variable value is added to the fixed desired value "1". What is most important for the arrangement of FIG. 1 are the arrangement components for forming the variable desired value. These components include especially a memory integrator 20 as well as a second and third adder 17.2 and 17.3. In second adder 17.2, the difference $\Delta\lambda = \lambda\_V - 1$ is formed. This value $\Delta\lambda$ is supplied to the memory integrator 20 together with the air mass flow signal LMS and a throughput correction signal KDS. The signal KDS is supplied from a correction characteristic field 21. The variable $\Delta\lambda \cdot LMS$ is multiplied by a factor which indicates the content of oxygen in air and results directly in the quantity of oxygen which flows into the catalytic converter 11 at $\Delta\lambda > 0$ or which must be taken from the catalytic converter 11 at $\Delta\lambda < 0$, in order to burn excess fuel. In the embodiment shown, the factor which describes the content of oxygen in air is considered in the throughput correction signal KDS. This signal further takes into account that not all oxygen which flows into the catalytic converter is adsorbed there and that not all fuel which flows into the catalytic converter is combusted by desorbed oxygen.

The output signal from integrator 20 is supplied to the above-mentioned third adder 17.3 where it is compared to a charge level desired value SPG_DES. It is here assumed that the memory integrator 20 is so adjusted that it emits the integration value zero when the catalytic converter is empty of oxygen and the integration value one when the catalytic converter is filled with oxygen. With the catalytic converter filled half with oxygen, the actual charge level SPG_ACT is then equal to 0.5. This is the desired charge level in the embodiment and it is for this reason that the desired charge level is selected correspondingly. If the actual charge level corresponds to the desired charge level, then the third adder 17.3 emits the value zero to a desired value change unit 22.

This desired value change unit is so configured that it emits, as a rule, a value greater than zero to the first adder 17.1 when the actual charge level is less than the desired charge level; otherwise, a negative signal is emitted. This means that, for less oxygen in the catalytic converter than corresponds to the desired charge level, the mixture supplied to the engine is leaned (desired value greater than one), in order to again store more oxygen in the catalytic converter. For the opposite condition, the mixture is enriched when the catalytic converter currently stores more oxygen than corresponds to the desired charge level. In exceptional cases, the desired value change unit 22 however makes no desired value change; instead, this unit emits a signal influencing directly the injection time to a multiplier 15.3. The function of the lambda controller 18 is blocked so that this direct influence is not countered. The lambda control loop is therefore without effect and, in lieu thereof, a control operates on the charge level of the catalytic converter. This exception function is triggered when the charge level deviates more than a pregiven difference from the desired charge level. In the embodiment shown, this deviation limit has the value ±0.3. The normal function of the desired value change for the lambda control is restored for a lesser deviation from the desired value. In the embodiment shown, this limit has the value ±0.2. The lambda control is then again enabled.

For intense transient operations, the condition occurs that the storage capacity of the catalytic converter is exhausted toward one end or the other so that rich or lean exhaust gas exits at its output which is detected by the rearward lambda probe 14.h. If this rearward lambda probe announces a lean mixture, then the storage capacity of the catalytic converter 11 is exhausted. The signal from the storage integrator 20 must then have the value one. If this is not the case, the value is perforce set to the value one with the aid of a synchronization unit 23. A corresponding synchronization is then undertaken when the rearward lambda probe 14.h announces a rich mixture. Then the catalytic converter 11 no longer stores oxygen and for this reason the output signal from the storage integrator 20 has to be zero. Accordingly, this value is actually adjusted by the synchronizing unit 23 in the storage integrator 20 in this case.

It is conceivable that the integration takes place correctly but that the maximum storable oxygen quantity has reduced suddenly by 10% because of poisoning of the catalytic converter. If a case during operation occurs wherein the storage capacity of the catalytic converter is exceeded, then the integration value from the storage integrator 20 is only at 0.9. This value is perforce set to one. If then in another unfavorable transient operating case, the catalytic converter is emptied completely of oxygen, then this is announced by the rearward probe; however, the integration value is only at 0.1 instead of at zero. The integration value is now again set to zero by the synchronizing unit 23 whereupon the foregoing is repeated. The storage integrator 20 integrates therefore only over a swing of 0.9 in lieu of one. It is here that the reduced storage capacity becomes manifest. This effect is used for adapting the storage capacity which is made by an adaptation unit 24. The adaptation unit 24 is supplied with the signals from the synchronizing unit 23 and the output signal from the storage integrator 20. The adaptation unit 24 utilizes the computed values present with synchronizing procedures for the charge level and forms therewith an adaptation factor AF as is described in greater detail below with respect to FIG. 4. This adaptation factor is emitted to the storage integrator 20 and is used thereby for forming the storage capacity as described below with respect to FIG. 5.

False integration results would be obtained continuously if the signal from the forward lambda probe 14.v would become increasingly falsified with increasing deterioration of the probe. In order to counter errors, the arrangement of FIG. 1 includes a probe calibrating unit 25 which supplies its output signal to a fourth adder 17.4. The probe calibration unit receives the output signal from this fourth adder as well as the output signal $\lambda\_H$ from the rearward lambda probe 14.h and emits its correction signal to the fourth adder 17.4 with such a magnitude that the mean values of both input signals just match.

FIGS. 2 to 6 illustrate a method as it can be carried out with the arrangement of FIG. 1.

The sequence of FIG. 2 provides a first initialization. The sequence is only then carried out when a new catalytic converter is mounted in the motor vehicle having the controlled engine or when the content of the value memory has been lost because of a fault. With the first initialization, a value SPG_ALT for the charge level is set to zero; this means that the assumption is made that the catalytic converter at first stores no oxygen. This is the case because a good storage capacity occurs only at high temperatures. At the same time, a value AF_ALT for the adaptation factor is set to one and a value SKF for the probe correction factor is set to one.

Figure 3:
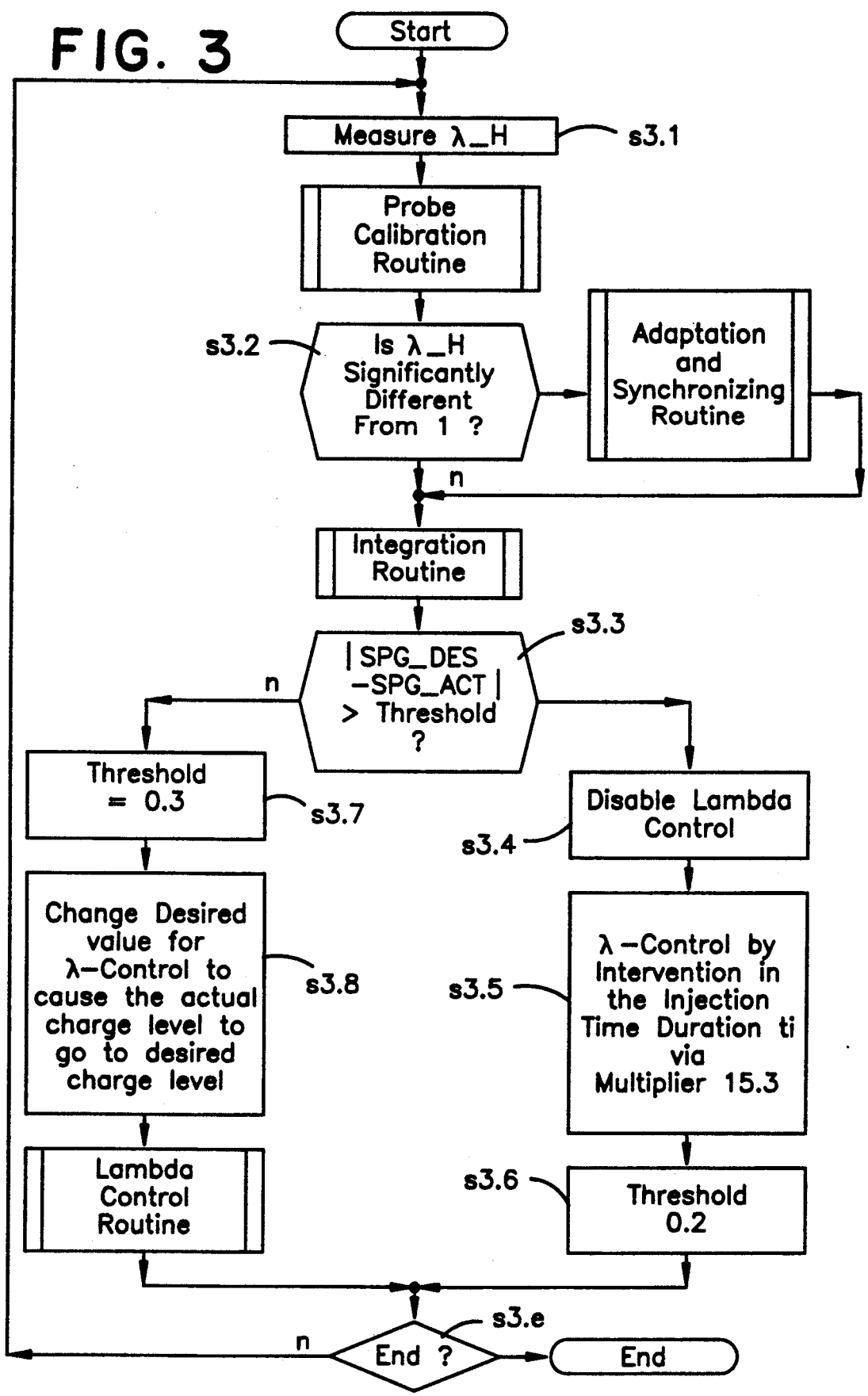
FIG. 3 is a flowchart for the entire sequence of a method for controlling the quantity of fuel with the aid of a comparison between the desired and actual charge levels of a catalytic converter.

After this first initialization, a sequence shown schematically in FIG. 3 is run through after each start of the engine beginning with an adequate warming of the catalytic converter (for example, 300° C. which temperature is reached approximately two minutes after the start of the engine). In a step s3.1, the signal $\lambda\_H$ is detected by the rearward probe 14.h. After this step s3.1, a probe calibrating routine follows which is explained in greater detail with respect to FIG. 6. This routine could also be placed directly in advance of an integration routine reached in the further sequence.

Actually, the probe calibration routine does not run in one pass-through with the other functions according to the sequence of FIG. 3; instead, the probe calibration routine is carried out separately in a very coarse time-slot pattern. In contrast, the lambda control routine is run through in a relatively fine time-slot pattern. The lambda control routine is shown below in the schematic sequence of FIG. 3. The lambda control routine is, for example, processed every 10 msec; whereas, the probe calibrating routine is carried out, for example, only once within a second or several seconds. In a step s3.2, a check is made as to whether the signal $\lambda\_H$ deviates significantly from the value one. If so, this then shows that the synchronization and adaptation procedures can be carried out as explained in greater detail with respect to the routine of FIG. 4 below. An integration routine then follows as is described in greater detail with respect to FIG. 5 independently of whether the above-mentioned intense deviation has been determined or not. The integration routine makes current the integration value in the storage integrator 20. With the aid of the actual charge level of the catalytic converter determined with the aid of the integration routine, the deviation between desired and actual charge levels is computed. If the amount of this deviation is greater than a threshold of 0.3 in the embodiment shown (step s3.3), then the program branches to a step s3.4 where first the lambda controller is switched off in order to greatly enrich or lean the air/fuel mixture in order to rapidly eliminate the large deviation via a direct intervention (step s3.5) in the injection duration ti (in dependence upon the sign of the deviation). In order to obtain a hysteresis performance of this function, the threshold for switching off the direct intervention is set at 0.2 in a step s3.6. If the amount of the deviation of desired charge level and actual charge level is less than this threshold, then the lambda controller is again switched on in a step s3.7 in the event the lambda controller had been switched off, and the threshold of 0.3 is again used for a possible renewed switchoff. Thereafter, the desired value for the lambda control is so changed in a step s3.8 that the actual charge level runs to the desired charge level. The lambda control then takes place in the known manner with the aid of this desired value. Thereafter, a check is made in step s3.e as to whether the method should be ended, for example, because the engine has been switched off. If this is not the case, then all of the above-mentioned steps are run through again.

In the adaptation and synchronization routine shown in FIG. 4, a check is made in a step s4.1 as to whether the rearward lambda probe shows a rich mixture. If this is the case, then a new adaptation factor AF is formed as AF_ALT/(1−SPG) for the adaptation in a step s4.2 (SPG in this case is at zero). After this computation, the synchronization takes place in a following step s4.3. In this synchronization, the actual charge level SPG is set to zero, that is the integration value of the storage integrator 20. Corresponding steps s4.4 and s4.5 apply in the case of an overflow of oxygen in the catalytic converter 11. The content of steps s4.4 and s4.5 can be seen in FIG. 4. The value of SPG is in this branch close to one. A step s4.6 follows the steps s4.3 and s4.5. In step s4.6, the adaptation factors AF computed in one of the steps s4.2 or s4.4 is smoothly averaged thereby terminating the adaptation and synchronization routine.

In the integration routine of FIG. 5, the actual air mass flow LMS is measured in a step s5.1 and the value $\Delta\lambda$ described above is computed. Furthermore, the throughput correction factor FKD is read out of the correction field 21 in dependence upon current values of engine speed (n) and the load L. The oxygen change $\Delta O_2$ is computed in a step s5.2 with the aid of the following: the engine speed (n), the load L, the component $k_1$ of oxygen in air, the adaptation factor AF and a measuring time interval $\Delta t$. This change is positive for positive $\Delta\lambda$ and negative for negative $\Delta\lambda$. The change of the oxygen quantity corresponds to a change $\Delta SPG$ of the charge level. This change is computed in a step s5.3 in that the value $\Delta O_2$ is divided by a constant $k_2$. This constant is a quantity which corresponds to the maximum oxygen storage capacity of the new catalytic converter. This quantity can also be used with an older catalytic converter since the aging or deterioration of the catalytic converter is considered in step s5.2 by means of the adaptation factor AF. With the aid of the change $\Delta SPG$ of the charge level, the actual charge level is computed in step s5.4 in the manner as it is used in step s3.3.

Figure 6:
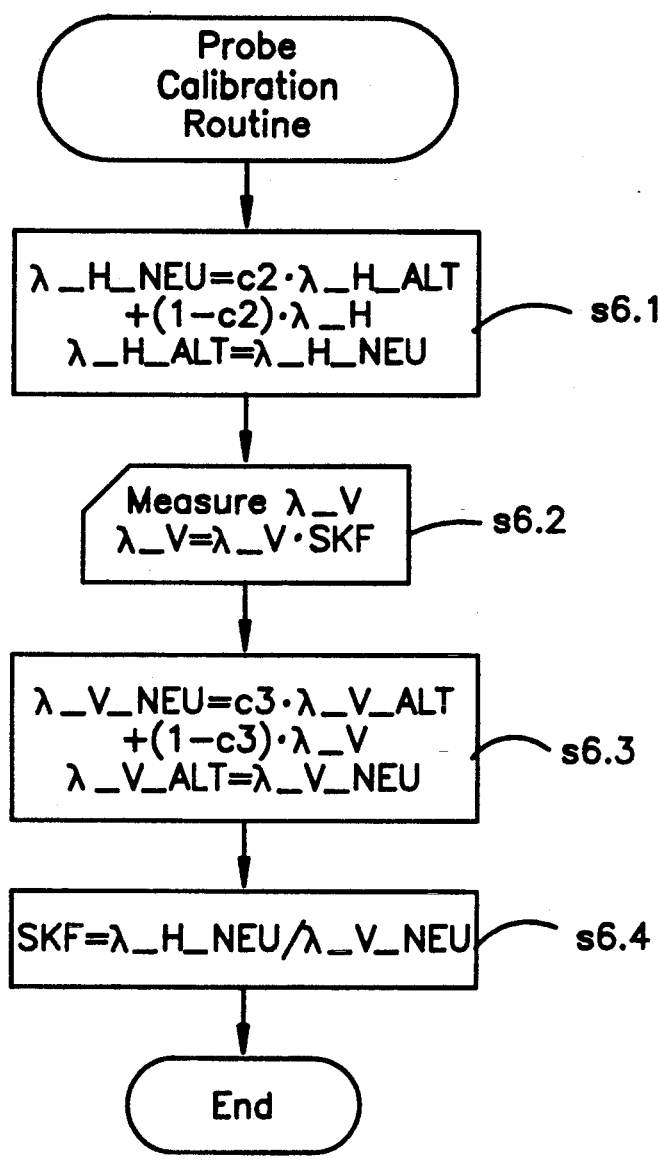
FIG. 6 is a flowchart of a probe calibrating routine in the sequence of FIG. 3.

In the probe calibration routine of FIG. 6, a conventional smoothed mean value formation of the signal $\lambda\_H$ of the rearward lambda probe 14.h is undertaken by using a factor $c_2$ with the signal $\lambda\_H$ being linearized to lambda values. Thereafter (step s6.2), the signal of the forward lambda probe $\lambda\_V$ is detected, linearized to lambda values, multiplied by a probe correction factor SKF and then likewise smoothly averaged (step s6.3). The probe correction factor SKF is computed as quotient between the mean value of the signal of the rearward probe and the mean value of the signal of the forward probe (step s6.4) thereby ending the method. The corrected probe signal of the forward probe is then available for the integration in the integration routine and also is available for the lambda control.

The described embodiment can be modified in many ways. For example, the adaptation can be deleted entirely or the adaptation factor can be used to lower the value for the maximum storable quantity of oxygen rather than for increasing the integration speed. The integration speed is then held constant. What is essential is only that in some way the oxygen charge level of the catalytic converter is determined or is measured and that the lambda control takes place in such a manner that a pregiven charge level is maintained as precisely as possible. The charge level sought after in the embodiment amounts to 50%. How this charge level is to be selected is however greatly dependent upon the dynamic performance of a particular internal combustion engine. If the engine tends to process toxic materials critically during transient operations and above all in lean phases, then the sought-after charge level is below 50%; whereas, for an internal combustion engine which displays the reverse performance, the sought-after charge level is displaced in the reverse direction.

It is understood that the foregoing description is that of the preferred embodiments of the invention and that various changes and modifications may be made thereto without departing from the spirit and scope of the invention as defined in the appended claims.

What is claimed is:

1. A method for controlling the fuel quantity for an internal combustion engine having a catalytic converter, the method comprising the steps of:
   determining the air mass flow inducted by the engine;
   determining a precontrol variable for the quantity of fuel in dependence on current values of operating variables of the engine;
   presetting a desired lambda value for the air/fuel mixture to be supplied to the engine;
   checking the actual lambda value of the exhaust gas forward of the catalytic converter;
   comparing the desired lambda value to the actual lambda value to form a comparison;
   controlling the fuel quantity in dependence upon said comparison;
   determining the oxygen actual charge level of the catalytic converter;
   comparing the determined actual charge level to a desired charge level; and,
   then, when the actual charge level is greater than the desired charge level, lowering the desired lambda value to below the value one; otherwise,
   when the actual charge level is less than the desired charge level, increasing the desired lambda value above the value one.

2. The method of claim 1, comprising the further step of correcting the signal of the lambda probe forward of the catalytic converter with the aid of the signal of a lambda probe rearward of the catalytic converter so that the mean value of the probe forward of the catalytic converter corresponds to the mean value of the signal rearward of the catalytic converter.

3. The method of claim 1, wherein, when the amount of the deviation between actual charge level and desired charge level has exceeded a pregiven first threshold, inhibiting a lambda control and carrying out an enrichment or a leaning, in dependence upon the sign of the deviation, until said deviation between actual charge level and desired charge level drops below a second pregiven threshold which is at most as great as said first threshold, and, then enabling the lambda control.

4. A method for controlling the fuel quantity for an internal combustion engine having a catalytic converter, the method comprising the steps of:
   determining the air mass flow inducted by the engine;
   determining a precontrol variable for the quantity of fuel in dependence on current values of operating variables of the engine;
   presetting a desired lambda value for the air/fuel mixture to be supplied to the engine;
   checking the actual lambda value of the exhaust gas forward of the catalytic converter;
   comparing the desired lambda value to the actual lambda value to form a comparison;
   controlling the fuel quantity in dependence upon said comparison;
   determining the oxygen actual charge level of the catalytic converter;
   comparing the determined actual charge level to a desired charge level;
   then, when the actual charge level is greater than the desired charge level, lowering the desired lambda value to below the value one; otherwise,
   when the actual charge level is less than the desired charge level, increasing the desired lambda value above the value one;
   determining the actual charge level from the maximum storable oxygen quantity and the current stored oxygen quantity with the current stored oxygen quantity being determined as a time integral of the product of: the air mass flow supplied to the engine and the actual lambda value.

5. The method of claim 4, wherein said product includes at least one correction factor which is determined from a characteristic field in dependence upon current values of operating variables of the engine.

6. The method of claim 4, comprising the step of setting the time integration value to zero when a lambda probe rearward of the catalytic converter indicates a rich mixture and setting the time integration value to the value for the maximum storable oxygen quantity when said lambda probe indicates a lean mixture.

7. The method of claim 6, further comprising the step of correspondingly reducing the value for maximum storable oxygen quantity when the difference between the integration value as present directly in advance of being set to zero and the integration value as present directly in advance of being set to the maximum value is less than the integration value for the maximum storable oxygen quantity.

8. The method of claim 7, wherein the above-mentioned reduction is a relative reduction which takes place in that the speed of the integration is increased by the quotient of the maximum storable oxygen quantity and the integration difference value.

9. An arrangement for controlling fuel quantity for an internal combustion engine having a catalytic converter, the arrangement comprising:

an air flow detector for detecting the air mass flow inducted by the engine;

means for determining a precontrol variable for the quantity of fuel in dependence upon current values of the operating variables of the engine;

means for presetting a desired lambda value for the air/fuel mixture to be supplied to the engine;

a lambda probe disposed forward of the catalytic converter for checking the actual lambda value of the exhaust gas of the engine;

comparison means for comparing said desired and actual lambda values to obtain a comparison;

a lambda controller for controlling the fuel quantity in dependence upon said comparison between said desired lambda value and said actual lambda value;

means for determining the oxygen actual charge level of the catalytic converter; and, means for changing said desired value for the lambda control in dependence upon a comparison between the actual and desired charge levels of the catalytic converter in such a manner that, when the actual charge level is greater than the desired charge level, the desired lambda value is lowered to below the value one; otherwise, when the actual charge level drops below the desired charge level, the desired lambda value is increased above the value one.

10. The arrangement of claim 9, further comprising a lambda probe rearward of the catalytic converter.

11. A method for controlling the fuel quantity for an internal combustion engine having a catalytic converter and having a lambda controller with a switching threshold, the method comprising the steps of:

determining the air mass flow inducted by the engine;

determining a precontrol variable for the quantity of fuel in dependence on current values of operating variables of the engine;

presetting a desired lambda value for the air/fuel mixture to be supplied to the engine;

checking the actual lambda value of the exhaust gas forward of the catalytic converter;

comparing the desired lambda value to the actual lambda value to form a comparison;

controlling the fuel quantity in dependence upon said comparison;

determining the oxygen actual charge level of the catalytic converter;

comparing the determined actual charge level to a desired charge level; and, then, when the actual charge level is greater than the desired charge level, changing the switching threshold in a first direction; otherwise, when the actual charge level is less than the desired charge level, changing the switching threshold in a second direction opposite said first direction.

12. A method for controlling the fuel quantity for an internal combustion engine having a catalytic converter, the method comprising the steps of:

determining the air mass flow inducted by the engine;

determining a precontrol variable for the quantity of fuel in dependence on current values of operating variables of the engine;

presetting a desired lambda value for the air/fuel mixture to be supplied to the engine;

checking the actual lambda value of the exhaust gas forward of the catalytic converter;

comparing the desired lambda value to the actual lambda value to form a comparison;

controlling the fuel quantity in dependence upon said comparison;

determining the oxygen actual charge level of the catalytic converter;

comparing the determined actual charge level to a desired charge level; and, then, when the actual charge level is greater than the desired charge level, changing the amplitude of P-jumps in a first direction; otherwise, when the actual charge level is less than the desired charge level, changing the amplitude of P-jumps in a second direction opposite to said first direction.

13. A method for controlling the fuel quantity for an internal combustion engine having a catalytic converter, the method comprising the steps of:

determining the air mass flow inducted by the engine;

determining a precontrol variable for the quantity of fuel in dependence on current values of operating variables of the engine;

presetting a desired lambda value for the air/fuel mixture to be supplied to the engine;

checking the actual lambda value of the exhaust gas forward of the catalytic converter;

comparing the desired lambda value to the actual lambda value to form a comparison;

controlling the fuel quantity in dependence upon said comparison;

determining the oxygen actual charge level of the catalytic converter;

comparing the determined actual charge level to a desired charge level; and, then, when the actual charge level is greater than the desired charge level, changing integration speeds and integration times in a first direction; otherwise, when the actual charge level is less than the desired charge level, changing integration speeds and integration times in a second direction opposite to said first direction.

* * * * *